Patented Dec. 27, 1949

2,492,543

UNITED STATES PATENT OFFICE 2,492,543

ELECTRIC RESISTANCE AND METHOD OF MAKING

Evert Johannes Willem Verwey, Eindhoven, Netherlands, assignor to Hartford National Bank and Trust Company, Hartford, Conn., as trustee No Drawing. Application July 24, 1946, Serial No. 685,918. In the Netherlands May 7, 1943

Section 1, Public Law 690, August 8, 1946
Patent expires May 7, 1963

6 Claims. (Cl. 106—39)

This invention relates to sintered electric resistances with negative temperature coefficient, substantially constituted by a homogeneous spinel phase which is built up from MgO, FeO, $Al_2O_3$, and $Fe_2O_3$, preferably in a molecular ratio MgO : $Al_2O_3$ which does not differ or slightly differs from 1.

Resistances of this kind in which furthermore the spinel phase at a temperature of 500° C. is not oversaturated with a second phase are described in my copending application for U. S. Patent, Serial No. 641,181, filed January 14, 1946, and, as mentioned therein, can be manufactured as follows. The required material which has been finely powdered is very well mixed and given the desired shape in a manner usual in ceramics, which is followed by sintering and cooling in such manner that the total quantities of the bivalent and trivalent oxides are in a molecular relation to each other which differs very slightly from 1. To this end, the sintering temperature and the composition (oxygen contents) of the ambient gaseous atmosphere during sinstering and cooling must be suitably chosen.

Now, it has been found that in the mass-manufacture of such resistances the correct adjustment of the sinstering temperature and the composition of the ambient gas involves difficulty, as a result of which it may occur that the properties of the resistances obtained noticeably vary at high load and that in the manufacture nonpermissible differences in properties arise.

According to the invention, these drawbacks do not occur if during sintering and cooling even the smallest excess of trivalent oxides is avoided.

The invention consists in a sintered electric resistance with negative temperature coefficient, built up from MgO, FeO, $Al_2O_3$ and $Fe_2O_3$ in the form of a homogeneous spinel phase in which a small excess of bivalent oxides (as a rule in the form of a mixed crystal of MgO and FeO) is dispersed. An excess of 5 to 10 mol per cent, calculated on the total of bivalent and trivalent oxides, is still permissible.

For clearness' sake it is mentioned that during the investigations which have led to the invention it has been found that the said small excess of bivalent oxides practically does not act upon the properties of the resistance whereas this is the case with an excess of trivalent oxides. This appears to be due to the fact that the bivalent oxides MgO and FeO, even in the form of mixed crystals, are little soluble or not soluble in the spinel phase at the sintering temperature and, accordingly, are uniformly dispersed in the finished product. In contradistinction thereto the trivalent oxides at the sintering temperature are very well soluble in the spinel phase so that they can settle in the bounding surfaces of the spinel crystals during cooling or during the use at high load and under these conditions can considerably influence the properties of the resistance.

The present invention includes, in addition, a process of manufacturing the resistances, according to which the required material, after it has been shaped in a manner usual in ceramics, is sintered, the composition of the starting material, the sintering temperature and the ambient gas atmosphere during sintering and during cooling being chosen so as to obtain a homogeneous spinel phase in which a small excess of bivalent oxides is dispersed.

Since, according to the invention, a small excess of bivalent oxides in the final product is permissible one is more at liberty in adjusting the said factors acting upon the final result than in the case that deviations from the spinel composition are not allowed. In addition, in the manufacture on a large scale the occurrence of an excess of trivalent oxides can be avoided with greater security.

One may start very simply from a mixture of which at least the iron oxide has been preliminarily brought as far as possible into the spinel state ($Fe_3O_4$) sintering taking place in an atmosphere having a weakly reducing action with respect to this mixture. The reducing action may be influenced not only by the composition of the gaseous atmosphere but also, since in this case the treatment of large quantities of material is concerned, it may advantageously be influenced by the speed of flowing of the gas.

To obtain a homogeneous final product, it may be desirable, after the constitutive materials have been very finely divided and intimately mixed, for example by means of grinding in a ball-mill, that the mixture obtained should be preliminarily heated for some time, for example for about 1 hour, at a temperature below the sintering temperature, for example at 1400° C., and that this should be followed by grinding again. If desirable the material may be preliminarily heated in the form of briquettes obtained by moulding.

It is desirable to start from a mixture corresponding as much as possible to the gross spinel composition since in this case the choice of such conditions during sintering, that no excess of trivalent oxides in the final product occurs, is simplest.

If one proceeds in this manner the preliminary heating may, for example, be carried out in a gaseous atmosphere in which the oxygen contents of the mixture do not change and the sintering may be carried out in a gaseous current having a weakly reducing action with respect to the mixture. To this end, the priliminary heating may advantageously be effected in a closed space.

The resistances according to the invention may be utilized, for example, for eliminating voltage impulses and as compensation resistances.

For the manufacture of a resistance one may proceed, for example, as follows. A mixture composed of 2.35 mol. $MgAl_2O_4$ and 1 mol. $Fe_3O_4$ is ground with alcohol in an iron ball-mill during 4 hours and is preliminarily heated at a temperature of 1400° C. in a closed tube filled with nitrogen and subsequently ground again for 4 hours. Tubes having an external diameter of 8 mm. and an internal diameter of 4 mm. are molded from the mixture using nitrocellulose as a binder. These tubes are sintered for 30 minutes at 1500° C. in a nitrogen current containing about 1.5 vol. per cent of oxygen and, subsequently, are rapidly cooled down in pure nitrogen. The resistances thus obtained with a length of 6.5 mm. have a resistance value of about 3000 ohms at room temperature. When loaded with 1.3 watts, the temperature of the tube increases up to about 300° C., whereas the resistance value decreases to 130 ohms.

In addition, with suitable proportioning the resistances can be used as voltage stabilisers. As compared with known resistances with negative temperature coefficient, the resistances according to the invention may be utilized in the latter application through a larger current range in view of their greater resistance to high temperatures. Thus, for example, a resistance according to the invention, prepared from $2MgAl_2O_4$ and $1Fe_3O_4$ with a thickness of 0.3 mm., housed in an exhausted glass bulb, exhibits a perfectly plane characteristic with loads comprised between 15 and 50 milliamps. As the highest limit of load is taken about 60 milliamps, that is a load of 1.5 watts per cm. length, the material in this case externally attaining a black body temperature of 1100° C.

What I claim is:

1. A negative temperature coefficient electrical resistance consisting of a uniform spinel phase of MgO, FeO, $Al_2O_3$ and $Fe_2O_3$ in which the molecular ratio of MgO:$Al_2O_3$ is approximately unity and containing an excess of between about 5 and 10 mol. per cent of MgO and FeO dispersed therein.

2. A negative temperature coefficient electrical resistance consisting of a uniform spinel phase of MgO, FeO, $Al_2O_3$ and $Fe_2O_3$ in which the molecular ratio of MgO:$Al_2O_3$ is approximately unity and containing an excess of between 5 and 10 mol. per cent of MgO and FeO in the form of mixed crystals dispersed therein.

3. A negative temperature coefficient electrical resistance consisting of a uniform spinel phase of MgO, FeO, $Al_2O_3$, and $Fe_2O_3$ in which one of the molecular ratios of MgO:$Al_2O_3$ and $$MgO+FeO:Al_2O_3+Fe_2O_3$$

is approximately unity and containing an excess of between 5 and 10 mol. per cent of MgO and FeO dispersed therein.

4. A negative temperature coefficient of electrical resistance consisting of a uniform spinel phase of MgO, FeO, $Al_2O_3$ and $Fe_2O_3$, in which the molecular ratio of the bivalent oxides to the trivalent oxides is approximately unity and containing an excess of between about 5 and 10 mol. per cent of MgO and FeO dispersed therein.

5. A method of manufacturing a negative temperature coefficient electrical resistance comprising the steps of mixing MgO, FeO, $Al_2O_3$ and $Fe_2O_3$ in the molar proportions for which one of the ratios MgO:$Al_2O_3$ and $$MgO+FeO:Al_2O_3+Fe_2O_3$$

is approximately unity, and heating the said mixture in a nitrogen atmosphere at a temperature between about 1400° C. and 1500° C. to form a uniform spinel phase of MgO, FeO, $Al_2O_3$ and $Fe_2O_3$ containing between about 5 and 10 mol. per cent of MgO and FeO dispersed therein.

6. A method of manufacturing a negative temperature coefficient electrical resistance comprising the steps of mixing MgO, $Al_2O_3$ and $Fe_3O_4$ in the proportions for which one of the ratios MgO:$Al_2O_3$ and MgO+FeO:$Al_2O_3$+$Fe_2O_3$ is approximately unity, and heating the mixture to a temperature between about 1400° C. and 1500° C. in a nitrogen atmosphere to form a uniform spinel phase of the said oxides containing between about 5 and 10 mol. per cent of MgO and FeO dispersed therein.

EVERT JOHANNES WILLEM VERWEY.

REFERENCES CITED

The following references are of record in the file of this patent:

UNITED STATES PATENTS

| Number | Name | Date |
|---|---|---|
| 2,048,263 | Haglund | July 21, 1936 |
| 2,370,443 | Biefeld | Feb. 27, 1945 |

FOREIGN PATENTS

| Number | Country | Date |
|---|---|---|
| 885,401 | France | 1943 |